United States Patent
Song et al.

(10) Patent No.: US 8,929,284 B2
(45) Date of Patent: Jan. 6, 2015

(54) METHOD AND APPARATUS TO ENABLE INTER-SYSTEM TRANSFER OF A PACKET SWITCHED SESSION

(75) Inventors: Osok Song, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1004 days.

(21) Appl. No.: 13/012,682

(22) Filed: Jan. 24, 2011

(65) Prior Publication Data

US 2011/0188451 A1 Aug. 4, 2011

Related U.S. Application Data

(60) Provisional application No. 61/301,146, filed on Feb. 3, 2010.

(51) Int. Cl.
| | |
|---|---|
| *H04W 4/00* | (2009.01) |
| *H04W 36/00* | (2009.01) |
| *H04W 80/04* | (2009.01) |
| *H04W 76/02* | (2009.01) |

(52) U.S. Cl.
CPC .......... *H04W 36/0033* (2013.01); *H04W 80/04* (2013.01); *H04W 76/026* (2013.01)
USPC ........................................................ 370/328

(58) Field of Classification Search
CPC ................................ H04W 4/00; H04W 88/04
USPC ........................................................ 370/328
See application file for complete search history.

(56) References Cited

U.S. PATENT DOCUMENTS

| | | |
|---|---|---|
| 2005/0003819 A1 | 1/2005 | Wu |
| 2009/0149183 A1 | 6/2009 | Wu et al. |

(Continued)

FOREIGN PATENT DOCUMENTS

| | | |
|---|---|---|
| CN | 101151936 A | 3/2008 |
| EP | 1835776 A1 | 9/2007 |

(Continued)

OTHER PUBLICATIONS

"3rd Generation Partnership Project; Technical Specification Group Services and System Aspects; IP Multimedia Subsystem (IMS) centralized services (Release 8)", 3GPP Standard; 3GPP TR 23.892, 3rd Generation Partnership Project (3GPP), Mobile Competence Centre ; 650, Route Des Lucioles; F-06921 Sophia-Antipolis Cedex ; France, No. V8.0.1, Mar. 1, 2008, pp. 1-167, XP050364164.

(Continued)

*Primary Examiner* — Shripal Khajuria
(74) *Attorney, Agent, or Firm* — John J. Ketchum

(57) ABSTRACT

Apparatus and methods for a user equipment (UE) to initiate an inter-system transfer of a communication session include listening for communications from a first and a second technology type network. Further, the aspects include establishing a circuit switched session with the first technology type network and establishing a packet switched session with a serving node of a first one of the first or the second technology type network. Also, the aspects include determining to transfer the packet switched session to a target node of a second one of the first or the second technology type network. Additionally, the aspects include transmitting a message, by the UE, to the target node, thereby causing the technology type network of the target node to fetch information about the packet switched session from the other network of the serving node in order to effect the transfer and continuation of the packet switched session.

43 Claims, 6 Drawing Sheets

(56) References Cited

U.S. PATENT DOCUMENTS

2009/0213834 A1    8/2009    Amirijoo et al.
2010/0172336 A1*   7/2010    Pehrsson et al. ............. 370/338

FOREIGN PATENT DOCUMENTS

| JP | 2010500835 A | 1/2010 |
|---|---|---|
| WO | WO-2006103547 A1 | 10/2006 |
| WO | WO-2009000316 A1 | 12/2008 |

OTHER PUBLICATIONS

International Search Report and Written Opinion—PCT/US2011/023512—ISA/EPO—May 27, 2011.
Taiwan Search Report—TW100104190—TIPO—May 16, 2014.

* cited by examiner

ABOUT THE PATENT

METHOD AND APPARATUS TO ENABLE INTER-SYSTEM TRANSFER OF A PACKET SWITCHED SESSION

CLAIM OF PRIORITY UNDER 35 U.S.C. §119

The present Application for Patent claims priority to Provisional Application No. 61/301,146 entitled "Method and Apparatus to Enable Inter System Handover of a Terminal with Simultaneous GERAN/UTRAN and E-UTRAN Radio Interfaces" filed Feb. 3, 2010, and assigned to the assignee hereof and hereby expressly incorporated by reference herein.

BACKGROUND

1. Field

The described aspects relate to wireless communications, and more particularly, to transfer of a packet switched session between different types of communication systems.

2. Background

Evolved-Terrestrial Radio Access Network (E-UTRAN) is a packet switched (PS) only system and is not connected to a circuit switched (CS) domain. As such, no voice service may be provided in E-UTRAN. There have been many attempts to provide voice service for an E-UTRAN user equipment (UE) such as, for example, including Internet Protocol (IP) Multimedia Subsystem (IMS) with single radio voice call continuity (SFVCC), Circuit Switched (CS) fall back (CSFB), and Voice over Long Term Evolution (LTE) via Generic Access (VoLGA). Each of these methods assume that a UE is equipped with both E-UTRAN and Global System for Mobile communications (GSM) Enhanced Data rates for GSM Evolution (EDGE) Radio Access Network (GERAN) / Universal Terrestrial Radio Access Network (UTRAN) radio interfaces, yet activates only one of them at a time.

Some UEs may activate E-UTRAN and GERAN/UTRAN radio interfaces simultaneously. When a UE has two receivers and two transmitters and the UE is under both E-UTRAN and UTRAN/GERAN coverage, the UE registers and camps on UTRAN/GERAN for the CS domain while registering and camping on E-UTRAN for the PS domain. The UE may then use UTRAN/GERAN for CS services such as voice calls and SMS, and may use the E-UTRAN for PS services at the same time.

Problems may arise when a UE, as described above, moves away from the E-UTRAN coverage area. In this case, the UE's PS services and session are to move from E-UTRAN to UTRAN/GERAN. Typically, when the UE is in the connected mode in E-UTRAN, PS handover from the E-UTRAN to UTRAN/GERAN is performed to move the UE's PS sessions. However, the radio network controller (RNC) in UTRAN or the base station controller (BSC) in GERAN may not be equipped to handle a PS handover request for an UE that already has a connection for CS services.

Moreover, problems may arise when attempting to use the network-initiated PS handover when the UE is active in both UTRAN (for CS services) and E-UTRAN (for PS services), and when the UE is served by two RNCs in UTRAN, e.g. the two RNCs are cascaded (S-RNC and D-RNC) using the Iur interface to serve the UE. In this case, when the PS handover from E-UTRAN to UTRAN is performed, the target UTRAN enodeB is under the D-RNC, not the S-RNC. Because the E-UTRAN does not know that the UE is already active in the UTRAN and served by a different RNC, e.g. the S-RNC, than the RNC controlling the target UTRAN nodeB, e.g. the D-RNC, the E-UTRAN (e.g. the eNode B) triggers PS handover towards the D-RNC. This PS handover towards the D-RNC of the UE would fail and cause undefined network behavior, because in UTRAN only one RNC can act as a UE's S-RNC (serving RNC).

Thus, it would be desirable to improve the performance and behavior of inter-system handover.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for a user equipment (UE) to initiate an inter-system transfer of a communication session includes listening for communications from a first technology type network and a second technology type network, wherein the first technology type network and the second technology type network include different technologies. Further, the method includes establishing a circuit switched session with the first technology type network, and establishing a packet switched session with a serving node of a first one of the first technology type network or the second technology type network. Also, the method includes determining to transfer the packet switched session to a target node of a second one of the first technology type network or the second technology type network, wherein the target node and the serving node are in different technology type networks. Additionally, the method includes transmitting a message, by the user equipment, to the target node, the message to cause one of the first technology type network or the second technology type network corresponding to the target node to fetch information about the packet switched session from one of the first technology type network or the second technology type network corresponding to the serving node in order to effect the transfer.

In another aspect, a processor for a user equipment (UE) to initiate an inter-system transfer of a communication session includes a first processor module to listen for communications from a first technology type network and a second technology type network, wherein the first technology type network and the second technology type network include different technologies. Further, the processor includes a second processor module to establish a circuit switched session with the first technology type network, and a third processor module to establish a packet switched session with a serving node of a first one of the first technology type network or the second technology type network. Also, the processor includes a fourth processor module to determine to transfer the packet switched session to a target node of a second one of the first technology type network or the second technology type network, wherein the target node and the serving node are in different technology type networks. Additionally, the processor includes a fifth processor module to transmit a message, by the user equipment, to the target node, the message to cause one of the first technology type network or the second technology type network corresponding to the target node to fetch information about the packet switched session from one of the first technology type network or the second technology type network corresponding to the serving node in order to effect the transfer.

In another aspect, a computer program product for a user equipment (UE) to initiate an inter-system transfer of a communication session includes a computer-readable medium.

The computer-readable medium includes at least one instruction operable to cause a computer to listen for communications from a first technology type network and a second technology type network, wherein the first technology type network and the second technology type network include different technologies. Also, the computer-readable medium includes at least one instruction operable to cause the computer to establish a circuit switched session with the first technology type network, and at least one instruction operable to cause the computer to establish a packet switched session with a serving node of a first one of the first technology type network or the second technology type network. Moreover, the computer-readable medium includes at least one instruction operable to cause the computer to determine to transfer the packet switched session to a target node of a second one of the first technology type network or the second technology type network, wherein the target node and the serving node are in different technology type networks. Additionally, the computer-readable medium includes at least one instruction operable to cause the computer to transmit a message, by the user equipment, to the target node, the message to cause one of the first technology type network or the second technology type network corresponding to the target node to fetch information about the packet switched session from one of the first technology type network or the second technology type network corresponding to the serving node in order to effect the transfer.

In still another aspect, a user equipment (UE) for initiating an inter-system transfer of a communication session includes means for listening for communications from a first technology type network and a second technology type network, wherein the first technology type network and the second technology type network include different technologies. Further, the UE includes means for establishing a circuit switched session with the first technology type network, and means for establishing a packet switched session with a serving node of a first one of the first technology type network or the second technology type network. Also, the UE includes means for determining to transfer the packet switched session to a target node of a second one of the first technology type network or the second technology type network, wherein the target node and the serving node are in different technology type networks. Additionally, the UE includes means for transmitting a message to the target node, the message to cause one of the first technology type network or the second technology type network corresponding to the target node to fetch information about the packet switched session from one of the first technology type network or the second technology type network corresponding to the serving node in order to effect the transfer.

In another aspect, a user equipment (UE) to initiate an inter-system transfer of a communication session includes a receiver system to listen for communications from a first technology type network and a second technology type network, wherein the first technology type network and the second technology type network include different technologies. Further, the UE includes a processor to establish a circuit switched session with the first technology type network, and to establish a packet switched session with a serving node of a first one of the first technology type network or the second technology type network. Also, the UE includes an inter-system transfer component to determine to transfer the packet switched session to a target node of a second one of the first technology type network or the second technology type network, wherein the target node and the serving node are in different technology type networks. Additionally, the UE includes a transmitter to transmit a message to the target node, the message to cause one of the first technology type network or the second technology type network corresponding to the target node to fetch information about the packet switched session from one of the first technology type network or the second technology type network corresponding to the serving node in order to effect the transfer.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
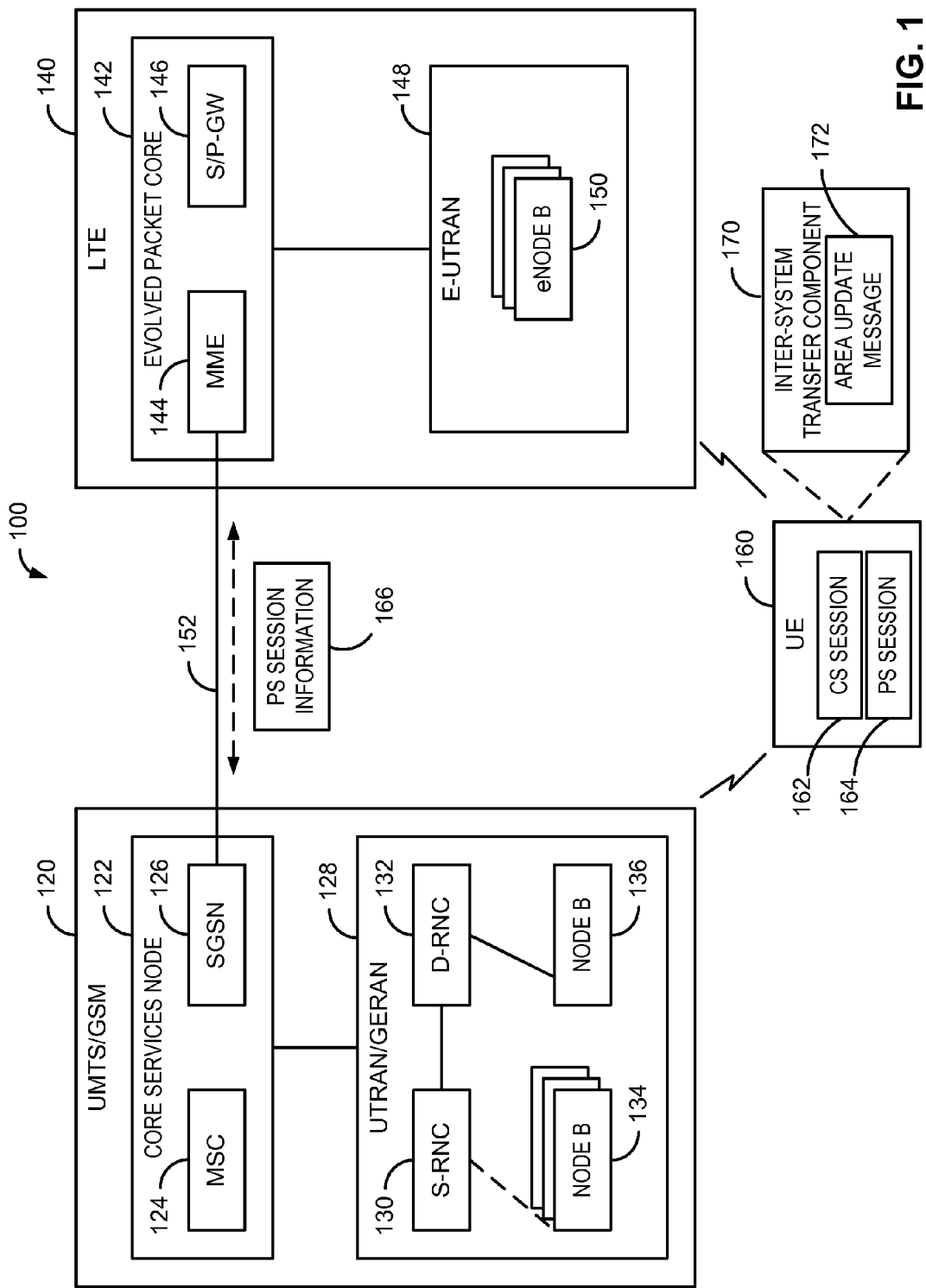
FIG. 1 is a schematic diagram of a communication system including a user equipment to initiate a transfer of a packet switched session from one technology type network to another technology type network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to inter-system transfer and continuation of a communication session, and more specifically to an apparatus and method of user equipment-initiated transfer of a packet switched session while maintaining an established circuit switched session. In an aspect, the user equipment may be capable of listening for and receiving signals from two networks, in some aspects at least part of the time substantially at the same time or simultaneously, and transmitting to one or both of the two networks, in some aspects transmitting substantially at the same time or simultaneously to both networks. In other words, the user equipment may be a dual communication interface device, which is a device having a first interface for transmitting and/or receiving from a first network, and a second interface for transmitting and/or receiving from a second network. In some aspects, a device with the first interface and the second interface for communications may be referred to as a multiple-input single-output (MISO) system, or a multiple-input multiple-output (MIMO) system. The user equipment may establish both a circuit switched session and a packet switched session, each of which may be with the same network or with different networks. In the described aspects, rather than sending a received signal strength measurement report to a serving one of the two networks, which would trigger a packet switched handover initiated by the network, the present apparatus and methods may instead send an area update message to a target one of the two networks. In other words, the target network is the network that is to receive a transfer of the packet switched session, while the serving network is the one of the two networks currently providing the packet switched session, and which also maintains the packet switched session information. The area update message may cause the target network to fetch information about the packet switched session from the serving network, thereby enabling transfer of the packet switched session and continuation of the packet switched session on the target network. Further, the apparatus and methods may optionally include sending a termination message to the serving network to terminate the packet switched session based on the user equipment initiated transfer.

The described apparatus and methods may be particularly relevant, for example, in a transfer of a packet switched session for a dual communication interface device between a Long Term Evolution (LTE) type network and a Universal Mobile Telecommunications System (UMTS) type network. In particular, as the LTE type network may only support packet switched sessions, a network initiated (e.g., based on a received signal strength measurement report) packet switched handover may be to or from a network already having a circuit switched session, which may cause unpredictable network behavior.

For example, the network behavior may be unpredictable when a user equipment moving from an LTE type network to a UMTS type network sends a measurement report to the serving LTE network that causes the LTE network to initiate a packet switched handover to the UMTS network in the case where the UMTS network already has an established circuit switched session for the user equipment. In other words, the network behavior may not be established to account for a dual communication interface device that may have separate packet switched and circuit switched sessions established simultaneous on two different types of networks, e.g. an LTE type network and a UMTS type network.

The described aspects avoid triggering the network-initiated packet switched handover procedure, for example, by sending the area update message to the target network, e.g. the network to receive the transferred packet switched session, instead of sending the measurement report to the serving network, e.g. the network currently supporting the packet switched session. The area update message effects the transfer of the packet switched session by causing the target network to fetch the corresponding session information from the serving network, thereby allowing transfer and continuation of the packet switched session on the target network. Thus, the described aspects produce a known network behavior for a dual communication interface device seeking to transfer a packet switched session to a target network while maintaining a circuit switched session with a serving network.

Referring to FIG. 1, a communication system 100 includes user equipment (UE) 160 communicatively coupled to, or at least able to simultaneously receive signals from, both a first technology type network 120, such as a UMTS/Global System for Mobile communications (GSM) network, and a second technology type network 140, such as an LTE network. As used herein, UMTS/GSM refers to a network using either UMTS or GSM technology. UMTS/GSM network 120 includes a core services node 122, which includes mobile switching center (MSC) 124 and Serving General Packet Radio Service (GPRS) Support Node (SGSN) 126. The UMTS/GSM network further includes a Universal Terrestrial Radio Access Network (UTRAN)/GSM Enhanced Data rates for GSM Evolution (EDGE) Radio Access Network (GE-RAN) 128, which includes one or more radio network controllers (RNCs) 130, 132, such as a Serving RNC (S-RNC) and a Drift RNC (D-RNC), and one or more NodeBs 134, 136. In the case of a UMTS network implementation, a UTRAN is provided, while a GERAN is provided in the case of a GSM network implementation.

LTE network 140 may include an evolved packet core 142, which may have a Mobility Management Entity (MME) 144 and a Serving/PDN (Packet Data Network) Gateway (S/P-GW) 146. The LTE network 140 may further include an evolved UTRAN (e-UTRAN) 148, which includes one or more eNodeBs 150. LTE may be a packet switched (also referred to as "PS") only network, and may not support circuit switched (also referred to as "CS") communications. UTRAN/GERAN may provide capabilities for both packet switched and circuit switched communications.

UMTS/GSM network 120 and LTE network 140 may communicate, such as via a backhaul communication link 152. For example, in an aspect, communication link 152 may allow for communication between SGSN 126 of UMTS/GSM network 120 and MME 144 of LTE network 140.

In an aspect, UE 160 may be a dual communication interface device that is able to listen for and receive communications from first technology type network 120, e.g. UMTS/GSM network, and the different, second technology type network 140, e.g. LTE network. In some aspects, for example, UE 160 may be able to listen for communications from both networks, at least part of the time, at substantially the same time, e.g. simultaneously. For example, the communication from both networks may be separate communications or signals that may be received by UE 160, at least in part, at substantially a same time. For example, the communications or signals may be related to one or more of network discovery, network acquisition, or establishing and managing circuit switched session 162 and/or packet switched session 164. As such, UE 160 may have a circuit switched session 162 with the first technology type network 120, and may simultaneously have a packet switched session 164 with a serving node, e.g. nodeBs 132, 134 or enodeB 150, of a first one of the first technology type network 120 or the second technology type network 140.

Moreover, in an aspect, UE 160 may include an inter-system transfer component 170 that may provide system 100 with a UE-initiated ability to transfer PS session 164 between first network 120 and second network 140, e.g. where the target node is in a different one of the networks than the serving node. In an aspect, for example, inter-system transfer component 170 determines to transfer the packet switched session 164 to a target node, e.g. nodeBs 132, 134 or enodeB 150, of second one of the first technology type network 120 or the second technology type network 140, wherein the second one of the networks is different from the first one of the networks. For example, inter-system transfer component 170 may determine to initiate the transfer of PS session 164, while maintaining a serving node for CS session 162, when UE 160 is moving away from one of the networks and toward the other one of the networks, or when an LTE type network is detected and is preferred for serving PS session 164, or when the UE can only transmit to one of the networks at a time and has an established PS session but desires to establish a CS session. Further, in an aspect, inter-system transfer component 170 may be hardware or software, or some combination thereof For example, in a first use case, inter-system transfer component 170 may determine to initiate the transfer of PS session 164 when the UE may have simultaneously active E-UTRAN and GERAN/UTRAN radio interfaces, e.g. via respective ones of two receivers and two transmitters, which may be supporting both a CS session in UTRAN/GERAN and a PS session in E-UTRAN at a same time, and the UE moves away from the E-UTRAN coverage. Thus, in this use case, the transfer of the PS session is from the E-UTRAN network to the UTRAN/GERAN network due to moving away from the E-UTRAN coverage.

Further, for example, in a second use case, inter-system transfer component 170 may determine to initiate the transfer of PS session 164 when the UE may have E-UTRAN and GERAN/UTRAN radio interfaces, e.g. associated with respective ones of two receivers and two transmitters, which may be supporting both a CS session and a PS session in UTRAN/GERAN, and the UE moves into the E-UTRAN coverage. Thus, in this use case, the transfer of the PS session is from the UTRAN/GERAN network to the E-UTRAN network due to moving into the E-UTRAN coverage.

Moreover, for example, in a third use case, inter-system transfer component 170 may determine to initiate the transfer of PS session 164 when the UE may have E-UTRAN and GERAN/UTRAN radio interfaces, e.g. associated with respective ones of two receivers and a single transmitter (such that the UE may only be able to transmit to one network at a time), which may be supporting a PS session in E-UTRAN and wherein a CS session is initiated in UTRAN/GERAN. For example, the CS session may be initiated by a user originating a call on the UE, or by a network paging the UE based on a call in UTRAN/GERAN destined for the device. Thus, in this use case, the transfer of the PS session is from the E-UTRAN network to the UTRAN/GERAN network due to initiating a CS session while under coverage of both the E-UTRAN network and the UTRAN/GERAN network.

It is noted that the above-noted use cases are only examples, and that the functionality of inter-system transfer component 170 in initiating transfer of PS session 164 is not limited to these use cases.

In at least the above situations, inter-system transfer component 170 may generate and initiate transmission of, or cause UE 160 to generate and transmit, a message 172 to the target node that causes transfer of the PS session 164 from one network to the other network. Specifically, message 172 may be an area update message, such as a target area update (TAU) message to an LTE type network or a routing area update (RAU) message in a UMTS/GSM type network, which causes one of the first technology type network 120 or the second technology type network 140 corresponding to the target node to fetch information about the packet switched session, e.g. PS session information 166, from one of the first technology type network 120 or the second technology type network 140 corresponding to the serving node in order to effect the transfer of PS session 164 from the serving node to the target node, and thus from one technology type network to the other technology type network. For example, in an aspect, the transfer of PS session 164 may occur while maintaining CS session 162 with the serving node. In other words, UE 160 may generate and send message 172 to a target node instead of, for example, generating and sending a received signal strength measurement report to a serving node.

For example, in the first use case discussed above where inter-system transfer component 170 determines to initiate transfer of PS session 164 from the E-UTRAN network to the UTRAN/GERAN network due to moving away from the E-UTRAN coverage, message 172 may be a routing area update (RAU) message sent to a session-managing network component in a UMTS/GSM type network, e.g. to a Serving General Packet Radio Service (GPRS) Support Node (SGSN) in order for the SGSN to fetch the PS session information of UE from a session-managing network component of the E-UTRAN network, e.g. a Mobility Management Entity (MME).

Further, for example, in the second use case discussed above where the inter-system transfer component 170 determines to initiate transfer of PS session 164 from the UTRAN/GERAN network to the E-UTRAN network due to moving into the E-UTRAN coverage, message 172 may be a target area update (TAU) message sent to a session-managing network component of the E-UTRAN network, e.g. an MME, in order for the MME to fetch the PS session information of UE from a session-managing network component in a UMTS/GSM type network, e.g. an SGSN.

Moreover, for example, in the third use case discussed above where inter-system transfer component 170 determines to initiate the transfer of PS session 164 from the E-UTRAN network to the UTRAN/GERAN network due to initiating a CS session while under coverage of both the E-UTRAN network and the UTRAN/GERAN network, message 172 may be a RAU message sent to a session-managing network component in a UMTS/GSM type network, e.g. to a SGSN, in order for the SGSN to fetch the PS session information 164 of UE from a session-managing network component of the E-UTRAN network, e.g. an MME.

As such, the described aspects provide for a UE-initiated transfer of PS session 164, rather than a network-initiated PS handover procedure that may be triggered by a received signal strength measurement report received from the UE at a serving node. Accordingly, in an aspect, the present apparatus and methods do not affect network-side behavior in that the described UE-initiated transfer of PS session 164 can be governed by modifications only at UE 160, e.g. by implementing the described inter-system transfer component 170 and/or the above-described functionality relating to sending area update message 172 when a transfer of PS session 164 is determined to be desirable by UE 160.

Figure 2:
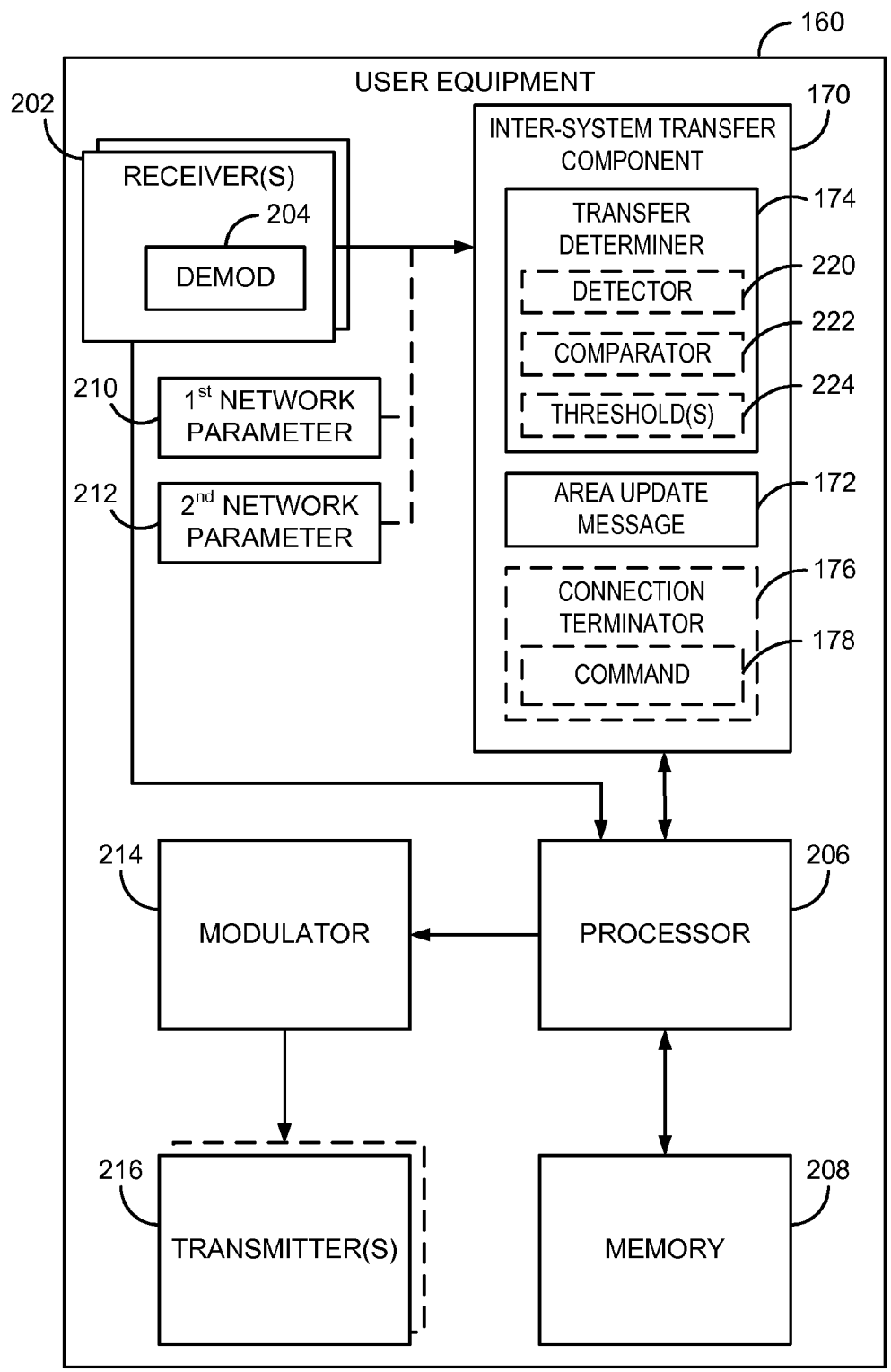
FIG. 2 is a schematic diagram of an aspect of a user equipment that performs a transfer of a packet switched session, as described herein.

Referring to FIG. 2, in an aspect, UE 160 that facilitates inter-system transfer of a communication session may include one or more receivers or a receiver system 202 that listens for and that may receive one or more signals from, for instance, one or more receive antennas (not shown), performs typical actions on (e.g., filters, amplifies, downconverts, etc.) the received signal(s), and digitizes the conditioned signal(s) to obtain samples. For example, in an aspect, receivers or receiver system 202 may include dual receivers, where a first receiver listens for and may receive communications from a first technology type network, and the second receiver listens for and may receive communications from a second technology type network, which is a different technology type than the first technology type network. For instance, the received communications may relate to a CS session or a PS session, as described above, and/or the received communications may be pilot or control channel signals relating to establishing communication sessions with the respective networks, or the communication signals may be related to network discovery or acquisition. Receivers 202 can each include a demodulator 204 that can demodulate received symbols and provide them to a processor 206 for channel estimation. Processor 206 can be a processor dedicated to analyzing information received by receivers 202 and/or generating information for transmission by one or more transmitters 216, a processor that controls one or more components of UE 160, and/or a processor that both analyzes information received by receivers 202, generates information for transmission by transmitters 216, and controls one or more components of UE 160. In an aspect, for example, processor 202 may establish and maintain either or both of a CS session or a PS session, as described above. In a further aspect, processor 202 may communicate with inter-system transfer component 170 to transfer a PS session, as described herein.

UE 160 can additionally include a memory 208 that is operatively coupled to processor 206 and that can store data to be transmitted, data that is received, information related to active data network connections and any other suitable information managing active data network connections and communicating via a communication channel.

It will be appreciated that memory 208 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods is intended to include, without being limited to, these and any other suitable types of memory.

Processor 206 can further be operatively coupled to inter-system transfer component 170, which may manage inter-system transfer of a communications session for UE 160. For example, inter-system transfer component 170 may transfer communications, or a portion thereof such as PS session 164 (FIG. 1), from a UMTS/GSM network to an LTE network, and vice versa. The inter-system transfer component 170 may initiate a transfer process, for example, by contacting the core network entity associated with the network which is to receive the transfer, e.g. the target network, such as via area update message 172. For example, in the case of a transfer of PS session 164 from UMTS/GSM 120 to LTE 140 (FIG. 1), the inter-system transfer component 170 may generate area update message 172 comprising a tracking area update (TAU) message to the MME 144 of the LTE network 140. In the case of a transfer of PS session 164 from LTE 140 to UMTS/GERAN 120, the inter-system transfer component 170 may generate area update message 172 comprising a routing area update (RAU) message to the SGSN 126 of the UMTS/GSM network 120. Further, inter-system transfer component 170 may communicate with transmitters 216 to initiate transmission of area update message 172 to a respective technology type network, as described herein.

In an aspect, for example, inter-system transfer component 170 may include a transfer determiner 174 that may determine whether or not a transfer of PS session 164 should be initiated. When inter-system transfer component 170 decides to perform a transfer of PS session 164, inter-system transfer component 170 may cause the generation and transmission of area update message 172 to effect the transfer, as described above. In an aspect, for example, transfer determiner 174 may include a detector 220 that detects one or more parameters, e.g. first network parameter 210 and second network parameter 212, from each type of network from which receivers 202 receive signals. For example, in an aspect, first network parameter 210 and second network parameter 212 may include, but are not limited to, received signals from first technology type network 120 and second technology type network 140, or characteristics of the received signals, such as a received signal strength measurement, also referred to as a received signal strength indicator (RSSI), received signals from first technology type network 120 and second technology type network 140. In an aspect, transfer determiner 174 may initiate area update message 172 simply based on detecting a signal from one of first technology type network 120 or second technology type network 140.

Moreover, in an aspect, transfer determiner 174 may include a comparator 222 that compares the detected first network parameter 210 and second network parameter 212, or other parameters computed by inter-system transfer component 170, to one or more thresholds 224 in order to determine whether or not to initiate area update message 172. The one or more thresholds 224 may include, but are not limited to, one or any combination of thresholds such as a minimum signal strength, a transfer hysteresis value, or any other threshold parameter that may be taken into account for determining whether or not to perform a transfer of a PS session. Further, for example, the other parameters computed by inter-system transfer component 170 may include, but are not limited to, computer parameters such as time periods associated with a measured signal strength value, etc. In any case, comparator 222 may compare a parameter to a respective threshold and determine whether or not the threshold is met. Accordingly, depending on such comparison, transfer determiner 174 may determine to initiate generation and transmission of area update message 172.

The inter-system transfer component 170 may optionally include a connection terminator 176 that may close a network connection based on the transfer of PS session 164. For example, connection terminator 176 may transmit a command 178 to the serving node upon determining to transfer the PS session to a target node, e.g. in order to gracefully release the session at the serving node. For instance, command 178 may include, but is not limited to, a radio resource connection (RRC) Release message or a non-access stratum (NAS) message.

Although depicted as being separate from the processor 206, it is to be appreciated that inter-system transfer component 170, demodulator 204, and/or modulator 214 can be part of the processor 206 or part of multiple processors.

Figure 3:
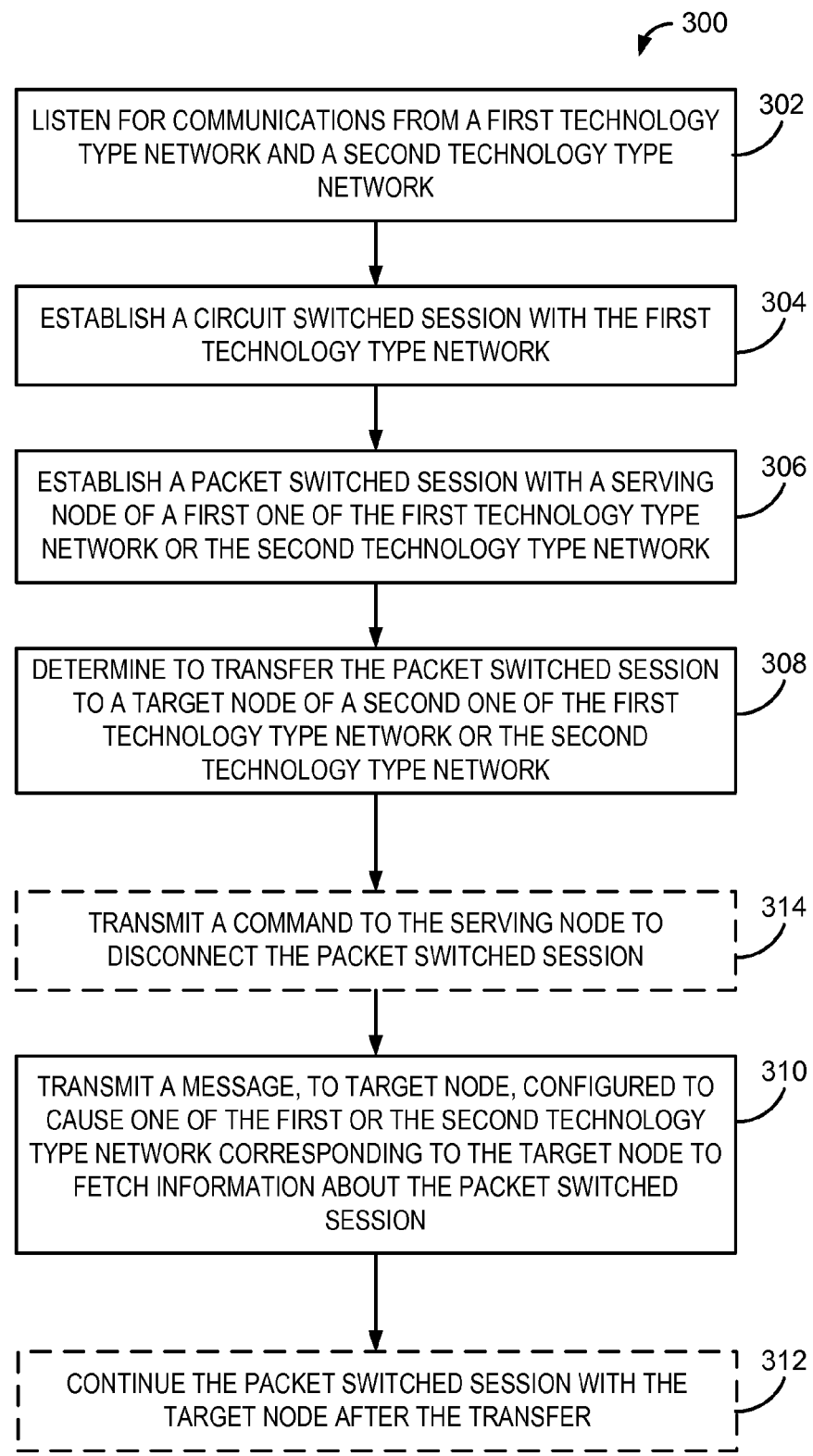
FIG. 3 is a flowchart of an aspect of a method of a user equipment initiated transfer of a packet switched session.

Referring to FIG. 3, in one aspect, a method of a user equipment initiating a transfer of a packet switched session includes an inter-system transfer. In one example, which should not be construed as limiting, the inter-system transfer may be between E-UTRAN 148 and GERAN/UTRAN 128 for UE 160 having simultaneous communications with GERAN /UTRAN 128 and E-UTRAN 148. This may include, for example, UE 160 having dual receivers 202 and transmitters 216, and/or UE 160 having dual receivers 202 and a single transmitter 216. As the UE 160 moves in and out of the coverage areas of a particular radio technology type network corresponding to the dual communication interfaces on the UE, it may be desired to transfer service to another radio technology type network, and hence to another communication interface of the UE. For packet switched (PS) services, this is typically done via a network-initiated PS handover procedure. However, as described above, the dual transmitter/receiver configuration may cause problems in the network, as the networks may not recognize the ability of the dual transmitter/receiver configuration of simultaneously having a circuit switched session along with the packet switched session. FIG. 3 includes a general method 300 for overcoming these and other problems with the typical network-initiated PS handover procedure.

In an aspect, method 300 includes listening for communications from a first technology type network and a second technology type network (Block 302). For example, the first technology type network and the second technology type network include different technologies, such as a UMTS/GSM type network 120 and an LTE type network 140. Further, for example, the communications may be signals received by receivers 202, as discussed above, from each of the different networks. For instance, the signals may be, but are not limited to, one or any combination of pilot signals for discovering a node in the network, and/or control signals or user data signals, which may be associated with an active connection or session with the respective network, or signals related to network discovery and/or acquisition. Further, for example, in some aspects, the listening for communications from a first technology type network and a second technology type network may include listening for communications from each network type at substantially a same time, e.g. simultaneously.

Further, method 300 includes establishing a circuit switched session with the first technology type network (Block 304), and establishing a packet switched session with a serving node of a first one of the first technology type network or the second technology type network (Block 306). For instance, in an aspect, which should not be construed as limiting, when the listening (Block 302) results in discovery and acquisition of one or both of first technology type network 120 or second technology type network 140, the UE 160 may establish one or more communication sessions. It should be noted, however, that the establishment of a communication session may not depend on the act of listening (Block 302). For example, the UE 160 may execute processor 206 to establish both a CS session 162 and a PS session 164 with a same one of the networks 120 or 140, or the processor 206 may establish the CS session 162 and the PS session 164 with different ones of the networks 120 and 140. For instance, the UE 160 may establish both a CS session 162 and a PS session 164 with a UMTS/GSM type network 120 when not within the coverage area of an LTE network 140. Also, for instance, the UE 160 may establish a CS session 162 with a UMTS/GSM type network 120 and a PS session 164 with an LTE type network 140 when the UE 160 is within the coverage areas of both types of networks, e.g. when the UE prefers the LTE network for PS sessions. Additionally, for example, in an aspect, processor 206 operates in conjunction with modulator 214 and transmitters 216, and optionally memory 208 which may include communication protocols and instructions, in order to transmit messages associated with the CS session 162 and the PS session 164 to the respective network. Moreover, processor 206 may further include all or a portion of code or instructions for communicating using the communication protocols, e.g. in order to transmit messages associated with the CS session 162 and the PS session 164 to the respective network Additionally, method 300 includes determining to transfer the packet switched session to a target node of a second one of the first technology type network or the second technology type network (Block 308). For example, the target node and the serving node, e.g. nodeB's 134, 136 and eNodeBs 150, are in different ones of the first technology type network 120 and the second technology type network 140. In an aspect, the UE 160 determines that it is desirable to move a PS connection 164 from one radio interface to another. For instance, the determination may be made by inter-system transfer component 170 and/or transfer determiner 174, as described above.

For example, in the case where the UE 160 has an active connection in E-UTRAN 148 for a packet switched (PS) session 164 and an active connection in UTRAN/GERAN 128 for circuit switched (CS) session 162, and the UE 160 moves away from the coverage area of the E-UTRAN network 148, then the UE 160 may wish to transfer the PS session 164 from the E-UTRAN network 148 to the UTRAN/GERAN network 128. Further, for example, in this aspect, an S-RNC 130 may have originally established the UE context, and thus may control the PS session information 166 for the PS session 164 of the UE 160. However, the UE 160 may have moved from the coverage area of a first node B 134 associated with S-RNC 130 into the coverage area of a new node B 136 associated with D-RNC 132, and thus UE 160 is currently being served by the D-RNC 132.

As another example, the UE 160 may have simultaneous CS and PS sessions 162 and 164 in a UTRAN type network 128, but may determine that coverage is available in an E-UTRAN type network 148 or that the E-UTRAN type network 148 may provide a more desirable service, e.g. based on having a stronger received signal than that of the UTRAN type network 128, thus making transfer of the PS session 164 desirable.

In another aspect, in the case of a UE 160 having dual receivers 202 and a single transmitter 216, the UE 160 can listen to both technology type networks 120 and 140 simultaneously, but can only transmit on a single network. As such, inter-system transfer component 170 may determine that when the UE 160 desires to establish a CS session 162 it is desirable to transfer the PS session 164 from an LTE type network 140, which may only support the PS session 164, to a UMTS/GSM type network 120, which can support both the PS session 164 and the desired CS session 162.

Moreover, method 300 includes transmitting a message, by the user equipment, to the target node to effect transfer of the PS session (Block 310). For example, in an aspect, the message 172 may cause a session management entity in a first one of the first technology type network 120 or the second technology type network 140 corresponding to the target node 134, 136 or 150 to fetch information 166 about the packet switched session 164 from a session management entity in a second one of the first technology type network 120 or the second technology type network 140 corresponding to the serving node 134, 136 or 150 in order to effect the transfer. For example, the UE context fetch may be between core network session management entities, e.g. SGSN 126 fetches PS session information 166 from MME 144, or vice versa, by the UE 160 sending area update message 172 to SGSN 126 through UTRAN/GERAN 128 or to MME 144 through E-UTRAN 148. In other words, in an aspect, the UE 160 contacts the network to be switched to, e.g. a session management entity in the target network, in order to initiate the transfer of the packet session 164 from the second network 140 to the first network 120. Thus, if the UE 160 desires to move a PS session 164 from an E-UTRAN network 148 to a UTRAN network 128, the UE 160 contacts the SGSN 126 to initiate the transfer. Likewise, if UE 160 desires to move a PS session 164 from a UTRAN network 128 to an E-UTRAN network 148, the UE 160 may contact the MME 144 to initiate the transfer. This is contrary to conventional network-based PS handover processing, wherein the UE 160 typically sends a measurement report to the serving NodeB or the serving eNodeB, e.g. the node to which the UE has an active connection that is carrying the PS session, and the network initiates the handover.

Optionally, as indicated by dashed lines, method 300 may further include continuing the PS session with the target node after the transfer (Block 312). For example, the processor 206 may continue communications associated with the PS session 164, e.g. in conjunction with receivers 202 and transmitters 216. In general, when the UE initiates the transfer of the PS session, the PS session will be continued with the target node.

Also, optionally or in addition, method 300 may further include transmitting a command to the serving node to disconnect the packet switched session (Block 314). For example, in an aspect, the transmitting of the command to disconnect to the serving node may occur before the transmitting of the message to the target node (Block 312), It should be noted, however, that the transmitting of the command to disconnect to the serving node may occur at any time, such as but not limited to at a time prior to the UE moving completely out of coverage of the serving node, or at a time before the transfer of the PS session. In other words, in an aspect, the UE 160 may also issue a command 178 to disconnect the network connection with the previously serving network for the PS service being transferred. For example, command 178 may include, but is not limited to, a radio resource connection (RRC) Release message or a non-access stratum (NAS) message, which allows the respective network that receives command 178 to gracefully release the connection with UE 160.

Figure 4:
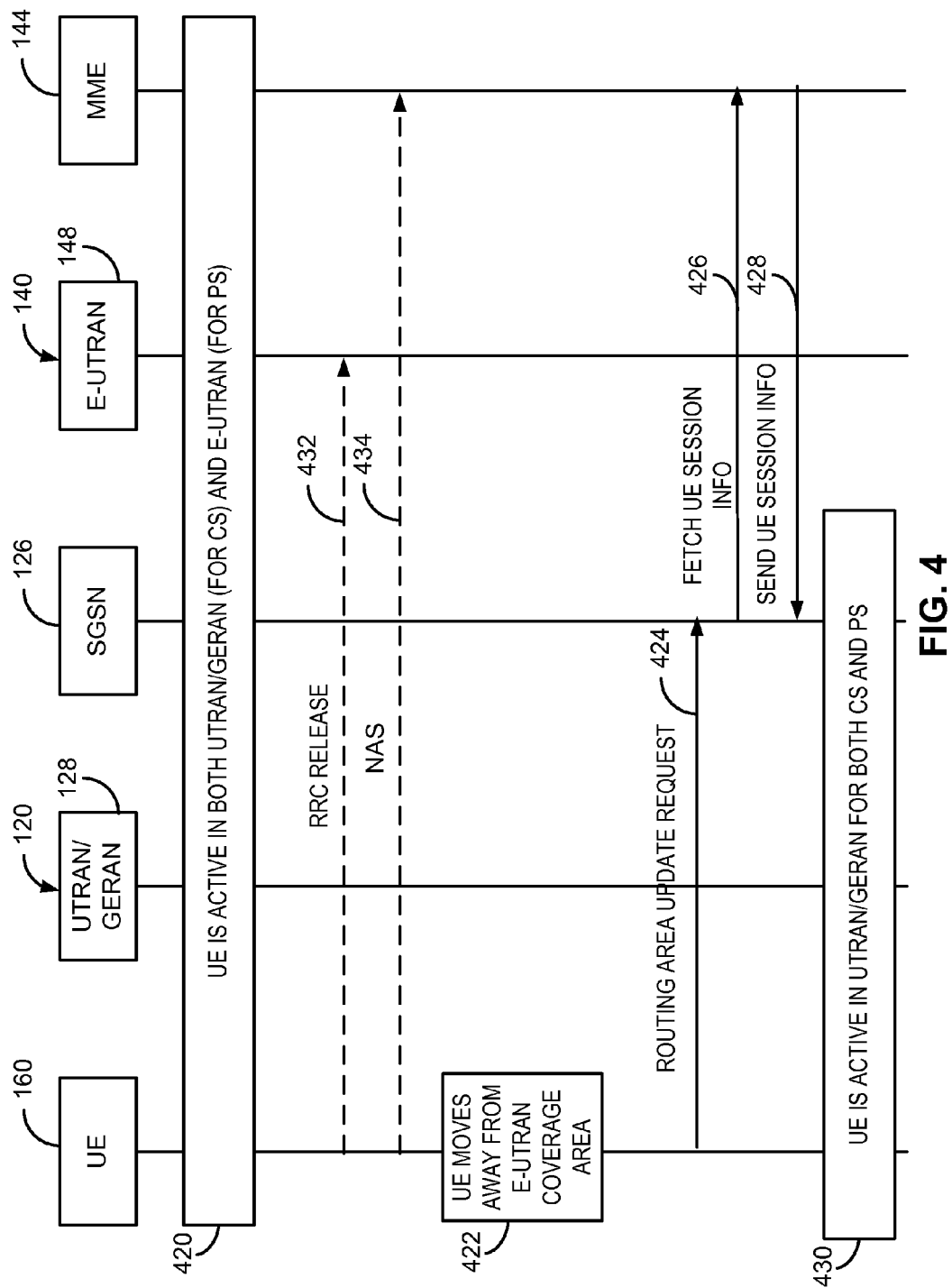
FIG. 4 is a message flow diagram of an aspect of a method of performing a transfer of a communication session.

Referring to FIG. 4, an exemplary exchange of messages among UE 160, UTRAN 128, SGSN 126, E-UTRAN 148, and MME 144 may occur when the UE 160 determines to initiate transfer of a PS session from E-UTRAN 148 to UTRAN 128. At 420, UE 160 is active in both UTRAN 128, for a CS session 162, and E-UTRAN 148, for a PS session 164. The UE 160 moves outside of the coverage area of E-UTRAN 148, at 422. In an aspect, the UE 160 then sends an update message 172, e.g. a Routing Area Update (RAU) request, to the SGSN 126, at 424. At 426, the RAU request triggers the SGSN 126 to fetch the UE context information, e.g. PS session information 166, from the MME 144 of the E-UTRAN 148, such as via communication link 152. And at 428 the E-UTRAN 148 responds by sending the UE session information, e.g. PS session information 166, to the SGSN 126.

At 430, by receiving the UE session information, e.g. PS session information 166, the SGSN 126 is able to move the PS session 164 from the E-UTRAN 148 to the UTRAN 128, and thus the transfer of the PS session 164 is made. Accordingly, at 430, the UE 160 is active in UTRAN 128 for both the CS session 162 and the PS session 164.

At 432 or 434, the UE 160 may also optionally send a message towards the E-UTRAN 148 to release the connection. For example, either of the message at 432 or the message at 434 may be transmitted prior to the UE moving out of coverage of the E-UTRAN. It should be noted, however, that the message at 432 or the message at 434 may be transmitted at any time, such as but not limited to prior to the transfer of the PS session. The message at 432 or 434 may be, for example, command 178 including but not limited to an RRC release message or a NAS message.

Figure 5:
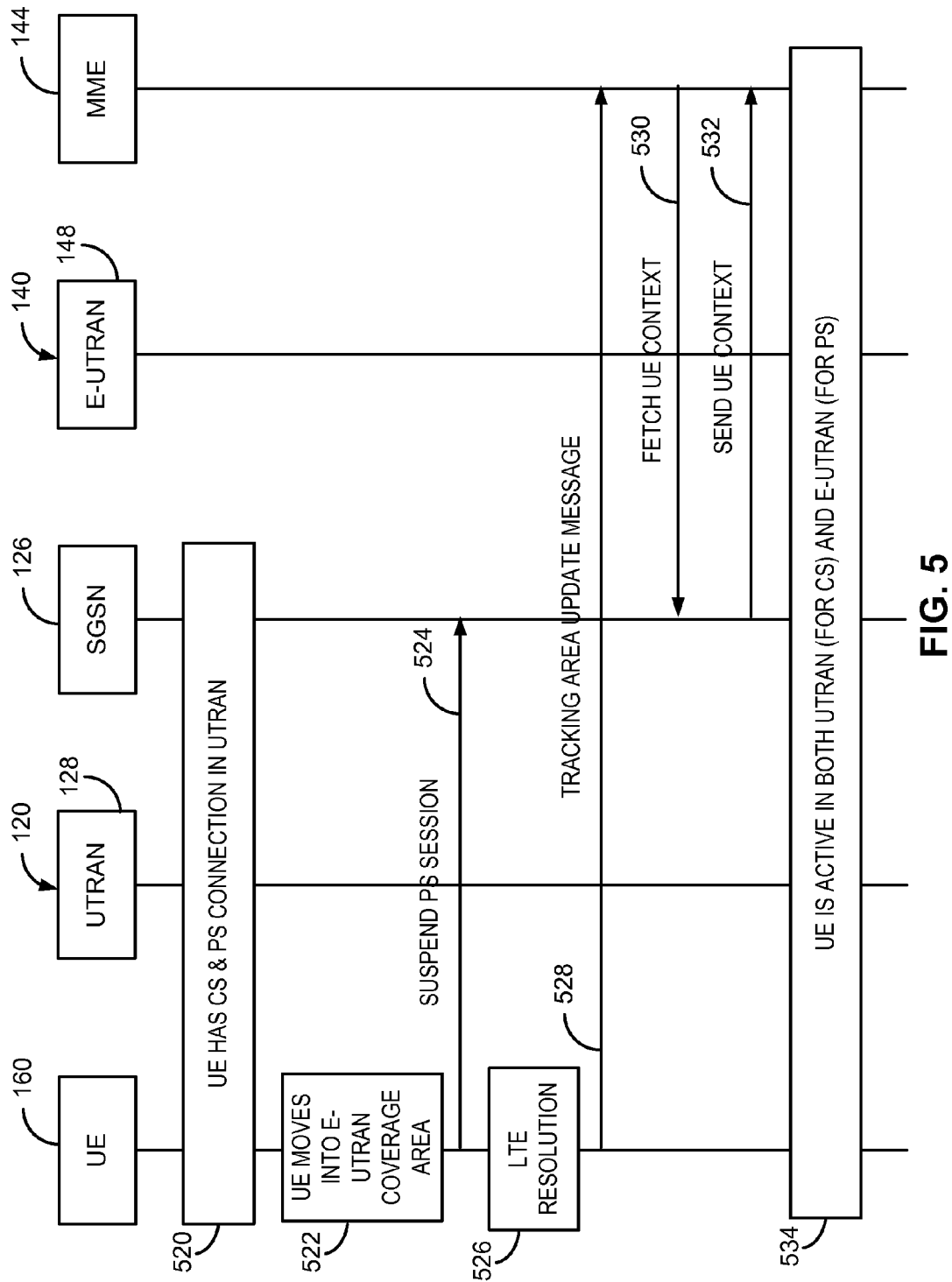
FIG. 5 is a message flow diagram of another aspect of a method of performing a transfer of a communication session.

Referring to FIG. 5, an exemplary message exchange among UE 160, UTRAN 128, SGSN 126, E-UTRAN 148, and MME 510 may occur when UE 160 determines to initiate transfer of a PS session from UTRAN 128 to E-UTRAN 148. As depicted at 520, UE 160 may have simultaneous active CS and PS sessions 162 and 164 in UTRAN 128. The UE 160 may then move into the coverage area of E-UTRAN 148, at 522, and may determine that a transfer of the PS session 164 from UTRAN 128 to E-UTRAN 148 is desirable. For example, the E-UTRAN 148 may provide improved service for PS session 164 as compared to the service provided by UTRAN 128.

At 524, in an aspect, UE 160 sends a message to SGSN 126 to suspend the PS session 164. The UE 160 then performs an LTE reselection process, at 526, which allows the UE 160 to select LTE network 140/E-UTRAN 148 for carrying the PS session 164 while maintaining the CS session 162 in UTRAN 128. At 528, the UE 160 may then issue a message 172, such as a tracking area update (TAU) message to MME 510. The TAU message causes the MME 510 to fetch the UE context from SGSN 126, at 530. At 532, SGSN 126 responds to MME 510 by providing the requested context information, e.g. PS session information 166. Accordingly, at 534, PS session 164 is transferred to LTE network 140/E-UTRAN 148 and UE 160 is active in both UTRAN 128, for CS session 162, and E-UTRAN 148, for PS session 162.

The exemplary call flow diagrams presented above relate to a UE having a dual transmitter and dual receiver configuration, or may be equally applicable to a UE configured with a dual receiver and single transmitter.

For example, for a UE having a dual receiver and single transmitter, as described in above in the third case, the UE may be within the coverage area of both the E-UTRAN and the UTRAN/GERAN. The UE may be registered and listening on the UTRAN/GERAN and the E-UTRAN at the same time, but may transmit only to one radio access network at a time. The UE may wish to begin a CS session in UTRAN/GERAN while the UE has an active PS session in the E-UTRAN. For example, the UE may receive a page for a CS call in UTRAN/GERAN or may wish to make a CS call from UTRAN/GERAN. As such, the UE may initiate a UE transition in order to perform the CS call as there is only a single transmitter. To perform the CS call on UTRAN/GERAN while keeping the PS session, the UE may perform a RAU with the UTRAN/GERAN so that the SGSN can fetch the PS session information from the MME in the E-UTRAN and transfer the PS session to the UTRAN/GERAN. Thus, the UE may then continue the PS session on UTRAN/GERAN, and disconnect the PS session from the E-UTRAN by sending an RRC or NAS message, thereby allowing the CS session to be established on the UTRAN/GERAN.

Figure 6:
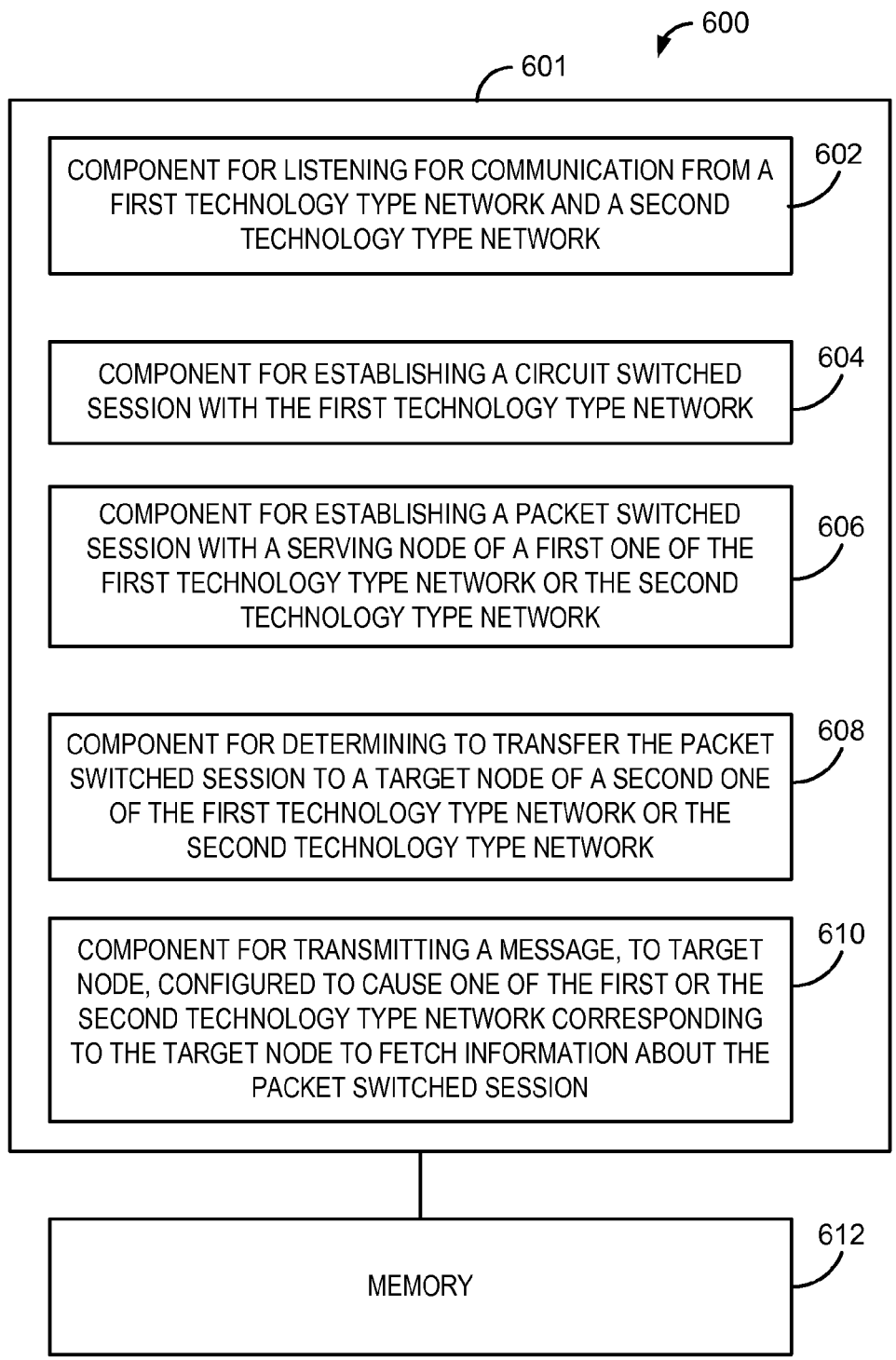
FIG. 6 is block diagram of an aspect of an apparatus for performing a transfer of a communication session.

Referring to FIG. 6, in one aspect, an apparatus 600 for initiating a transfer of a communication session, such as a transfer of a packet switched session, may include but is not limited to one of a user equipment, an access terminal or a mobile device. It is to be appreciated that apparatus 600 is represented as including functional blocks, which can be functional blocks that represent functions implemented by a processor, software, or combination thereof (e.g., firmware).

Apparatus 600 includes a logical grouping 601 of components or means that can act in conjunction. For instance, at 602, logical grouping 601 can include a component or means for listening for communications from a first technology type network and a second technology type network. For example, in some aspects, the component or means for listening for communications from a first technology type network and a second technology type network at 602 may be able to listen for communications from each network at substantially a same time, e.g. simultaneously. In one aspect, for example, the component or means for listening for communications from each type network may be receivers or receiver system 202 of user equipment 160, as described above.

Further, at 604 and 606, logical grouping 601 can include a component or means for establishing a circuit switched session with the first technology type network, and a component or means for establishing a packet switched session with a serving node of a first one of the first technology type network or the second technology type network, respectively. In one aspect, for example, the component or means for establishing the CS session and the PS session may include processor 206 of UE 160, for instance, executing respective communication protocols.

Additionally, at 608, logical grouping 601 can include a component or means for determining to transfer the packet switched session to a target node of a second one of the first technology type network or the second technology type network. In one aspect, for example, the component or means for determining to transfer the packet switched session may include inter-system transfer component 170 and/or transfer determiner 174 described above.

Further, at 610, logical grouping 601 can include a component or means for transmitting a message, to target node, the message to cause one of the first or the second technology type network corresponding to the target node to fetch information about the packet switched session. In one aspect, for example, the component or means for transmitting the message may include one or more of inter-system transfer component 170 and/or transfer determiner 174, or processor 206, or transmitter(s) 216, as described above.

Additionally, apparatus 600 can include a memory 612 that retains instructions for executing functions associated with the components or means 602, 604, 606, 608 and 610. While shown as being external to memory 612, it is to be understood that one or more of the components or means 602, 604, 606, 608 and 610 can exist within memory 612. In an aspect, for example, memory 612 may be memory 208 of UE 160, as described above.

Moreover, components or means 602, 604, 606, 608 and 610 may be respective processing modules within one processor or a plurality of processors, such as processor 206 described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a user equipment (UE) or access terminal, which can be a wired terminal or a wireless terminal. A UE can also be called a system, device, subscriber unit, subscriber station, mobile station, mobile, mobile device, remote station, remote terminal, access terminal, user terminal, terminal, communication device, user agent, or user device. A UE may be a wireless terminal such as a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a nodeB, eNodeB, or base station. A nodeB, eNodeB, or base station may be utilized for communicating with one or more UEs.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented above in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may include one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be non-transitory, and which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes a computer storage media. A storage medium may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for a user equipment (UE) to initiate an inter-system transfer of a communication session, comprising:
    listening for communications from a first technology type network and a second technology type network, wherein the first technology type network and the second technology type network comprise different technologies;
    establishing a circuit switched session with the first technology type network;
    establishing a packet switched session with a serving node of the second technology type network;
    determining, by the UE, to transfer the packet switched session to a target node of the first technology type network;
    transmitting a message, by the UE, to the target node-to cause the target node to fetch information about the packet switched session from the serving node in order to effect the transfer, wherein transmitting the message to the target node causes the transfer of only the packet switched session; and
    maintaining the circuit switched session with the first technology type network after the transfer of the packet switched session.

2. The method of claim 1, wherein transmitting the message to the target node is performed instead of transmitting a measurement report to the serving node.

3. The method of claim 1, wherein transmitting the message to the target node further comprises transmitting an area update message.

4. The method of claim 3, wherein transmitting the area update message further comprises transmitting a routing area update (RAU) message destined for a Serving General Packet Radio Service (GPRS) Support Node (SGSN).

5. The method of claim 4, wherein the RAU message is further to cause the SGSN to fetch the information about the packet switched session from a Mobility Management Entity (MME).

6. The method of claim 3, wherein transmitting the area update message further comprises transmitting a target area update (TAU) message destined for a Mobility Management Entity (MME).

7. The method of claim 6, wherein the TAU message is further to cause the MME to fetch the information about the packet switched session from a Serving General Packet Radio Service (GPRS) Support Node (SGSN).

8. The method of claim 1, further comprising transmitting a command to the serving node to disconnect the packet switched session.

9. The method of claim 8, wherein transmitting the command to the serving node to disconnect the packet switched session further comprises transmitting the command either prior to or subsequent to transmitting the message to the target node.

10. The method of claim 8, wherein transmitting the command to the serving node further comprises transmitting either a radio resource control (RRC) connection release message having a cause code that effects a connection termination or a non-access stratum (NAS) message.

11. The method of claim 1, wherein the target node and the serving node are in different ones of the first technology type network and the second technology type network, and wherein the listening for the communications from the first technology type network and the second technology type network further comprises concurrently listening for each technology type network.

12. The method of claim 1, further comprising continuing the packet switched session with the target node after the transfer.

13. The method of claim 1, wherein the first technology type network and the second technology type network are selected from a group consisting of a Universal Mobile Telecommunications System (UMTS) type network and a Long Term Evolution (LTE) type network.

14. The method of claim 1, wherein the first technology type network and the second technology type network are selected from a group consisting of a Universal Terrestrial Radio Access Network (UTRAN) type network, an Evolved-Terrestrial Radio Access Network (E-UTRAN) type network, and a Global System for Mobile communications (GSM) Enhanced Data rates for GSM Evolution (EDGE) Radio Access Network (GERAN) type network.

15. A processor for a user equipment (UE) to initiate an inter-system transfer of a communication session, comprising:
   a first processor module to listen for communications from a first technology type network and a second technology type network, wherein the first technology type network and the second technology type network comprise different technologies;
   a second processor module to establish a circuit switched session with the first technology type network;
   a third processor module to establish a packet switched session with a serving node of the second technology type network;
   a fourth processor module to determine, by the UE, to transfer the packet switched session to a target node of the first technology type network;
   a fifth processor module to transmit a message, by the UE, to the target node, to cause the target node to fetch information about the packet switched session from the serving node in order to effect the transfer, wherein the message causes the transfer of only the packet switched session; and
   a sixth processor module to maintain the circuit switched session with the first technology type network after the transfer of the packet switched session.

16. The processor of claim 15, wherein the fifth processor module transmits the message to the target node instead of transmitting a measurement report to the serving node.

17. The processor of claim 15, wherein the message comprises an area update message.

18. The processor of claim 15, wherein the sixth processor module is further to continue the packet switched session with the target node after the transfer.

19. The processor of claim 15, wherein the first technology type network and the second technology type network are selected from a group consisting of a Universal Mobile Telecommunications System (UMTS) type network and a Long Term Evolution (LTE) type network.

20. A non-transitory computer-readable storage medium for a user equipment (UE) to initiate an inter-system transfer of a communication session, comprising:
   at least one instruction operable to cause a computer to listen for communications from a first technology type network and a second technology type network, wherein the first technology type network and the second technology type network comprise different technologies;
   at least one instruction operable to cause the computer to establish a circuit switched session with the first technology type network;
   at least one instruction operable to cause the computer to establish a packet switched session with a serving node of the second technology type network;
   at least one instruction operable to cause the computer to determine, by the UE, to transfer the packet switched session to a target node of the first technology type network;
   at least one instruction operable to cause the computer to transmit a message, by the UE, to the target node to cause the target node to fetch information about the packet switched session from the serving node in order to effect the transfer, wherein the message causes the transfer of only the packet switched session; and
   at least one instruction operable to cause the computer to maintain the circuit switched session with the first technology type network after the transfer of the packet switched session.

21. The computer-readable storage medium of claim 20, wherein the at least one instruction operable to cause the computer to transmit the message causes transmitting the message to the target node instead of transmitting a measurement report to the serving node.

22. The computer-readable storage medium of claim 20, wherein the message comprises an area update message.

23. The computer-readable storage medium of claim 20, further comprising at least one instruction operable to cause the computer to continue the packet switched session with the target node after the transfer.

24. The computer-readable storage medium of claim 20, wherein the first technology type network and the second technology type network are selected from a group consisting of a Universal Mobile Telecommunications System (UMTS) type network and a Long Term Evolution (LTE) type network.

25. A user equipment (UE) for initiating an inter-system transfer of a communication session, comprising:
   means for listening for communications from a first technology type network and a second technology type network, wherein the first technology type network and the second technology type network comprise different technologies;
   means for establishing a circuit switched session with the first technology type network;
   means for establishing a packet switched session with a serving node of the second technology type network;
   means for determining to transfer the packet switched session to a target node of the first technology type network;
   means for transmitting a message to the target node to cause the target node to fetch information about the packet switched session from the serving node in order to effect the transfer, wherein the message causes the transfer of only the packet switched session; and
   means for maintaining the circuit switched session with the first technology type network after the transfer of the packet switched session.

26. The UE of claim 25, wherein the means for transmitting the message causes transmitting the message to the target node instead of transmitting a measurement report to the serving node.

27. The UE of claim 25, wherein the message comprises an area update message.

28. The UE of claim 25, further comprising means for continuing the packet switched session with the target node after the transfer.

29. The UE of claim 25, wherein the first technology type network and the second technology type network are selected from a group consisting of a Universal Mobile Telecommunications System (UMTS) type network and a Long Term Evolution (LTE) type network.

30. A user equipment (UE) to initiate an inter-system transfer of a communication session, comprising:
   a receiver system to listen for communications from a first technology type network and a second technology type network, wherein the first technology type network and the second technology type network comprise different technologies;
   a processor to establish a circuit switched session with the first technology type network, and to establish a packet switched session with a serving node of the second technology type network;

an inter-system transfer component to determine to transfer the packet switched session to a target node of the first technology type network; and a transmitter to transmit a message to the target node to cause the target node to fetch information about the packet switched session from the serving node in order to effect the transfer, wherein the message causes the transfer of only the packet switched session; and wherein the processor is further configured to maintain the circuit switched session with the first technology type network after the transfer of the packet switched session.

31. The UE of claim 30, wherein the inter-system transfer component initiates transmitting the message to the target node instead of transmitting a measurement report to the serving node.

32. The UE of claim 30, wherein the message further comprises an area update message.

33. The UE of claim 32, wherein the area update message further comprises a routing area update (RAU) message destined for a Serving General Packet Radio Service (GPRS) Support Node (SGSN).

34. The UE of claim 33, wherein the RAU message is further to cause the SGSN to fetch the information about the packet switched session from a Mobility Management Entity (MME).

35. The UE of claim 32, wherein the area update message further comprises a target area update (TAU) message destined for a Mobility Management Entity (MME).

36. The UE of claim 35, wherein the TAU message is further to cause the MME to fetch the information about the packet switched session from a Serving General Packet Radio Service (GPRS) Support Node (SGSN).

37. The UE of claim 30, wherein the inter-system transfer component is further to transmit a command to the serving node to disconnect the packet switched session.

38. The UE of claim 37, wherein the inter-system transfer component is further to transmit the command to the serving node either prior to or subsequent to the transmitter transmitting the message to the target node.

39. The UE of claim 37, wherein the command further comprises either a radio resource control (RRC) connection release message having a cause code that effects a connection termination or a non-access stratum (NAS) message.

40. The UE of claim 30, wherein the target node and the serving node are in different ones of the first technology type network and the second technology type network, and wherein the communications from the first technology type network and the second technology type network are received from each technology type network concurrently.

41. The UE of claim 30, wherein the processor continues the packet switched session with the target node after the transfer.

42. The UE of claim 30, wherein the first technology type network and the second technology type network are selected from a group consisting of a Universal Mobile Telecommunications System (UMTS) type network and a Long Term Evolution (LTE) type network.

43. The UE of claim 30, wherein the first technology type network and the second technology type network are selected from a group consisting of a Universal Terrestrial Radio Access Network (UTRAN) type network, an Evolved-Terrestrial Radio Access Network (E-UTRAN) type network, and a Global System for Mobile communications (GSM) Enhanced Data rates for GSM Evolution (EDGE) Radio Access Network (GERAN) type network.

* * * * *